United States Patent
Barajas Gonzalez et al.

(10) Patent No.: US 11,165,760 B2
(45) Date of Patent: Nov. 2, 2021

(54) INCREASING SECURITY OF OBJECTS IN CLOUD ENVIRONMENTS BY USING A TWO-PART ENCRYPTION SCHEME

(71) Applicant: International Business Machines Corporation, Armonk, NY (US)

(72) Inventors: Emmanuel Barajas Gonzalez, Guadalajara (MX); Aditya G. Surampudi, Hyderabad (IN); Shaun E. Harrington, Sahuarita, AZ (US); Gary Anna, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 16/368,069

(22) Filed: Mar. 28, 2019

(65) Prior Publication Data
US 2020/0314075 A1    Oct. 1, 2020

(51) Int. Cl.
| | | |
|---|---|---|
| *H04L 29/06* | (2006.01) | |
| *H04L 9/06* | (2006.01) | |
| *H04L 9/14* | (2006.01) | |
| *H04L 9/08* | (2006.01) | |
| *G06F 21/60* | (2013.01) | |
| *G06F 21/62* | (2013.01) | |

(52) U.S. Cl.
CPC ........ *H04L 63/0478* (2013.01); *G06F 21/602* (2013.01); *G06F 21/6218* (2013.01); *H04L 9/0643* (2013.01); *H04L 9/0656* (2013.01); *H04L 9/0861* (2013.01); *H04L 9/0894* (2013.01); *H04L 9/14* (2013.01); *H04L 63/062* (2013.01); *H04L 2463/061* (2013.01)

(58) Field of Classification Search
CPC . H04L 63/0478; H04L 63/062; H04L 9/0643; H04L 9/14; H04L 9/0894; H04L 9/0861; H04L 9/0656; H04L 2463/061; H04L 9/083; H04L 63/0428; G06F 21/602; G06F 21/6218; G06F 21/6209
See application file for complete search history.

(56) References Cited

U.S. PATENT DOCUMENTS

| | | | |
|---|---|---|---|
| 8,837,734 B2 | 9/2014 | McCallum et al. | |
| 9,544,140 B1 * | 1/2017 | Bhatia | ........... H04L 9/34 |
| 9,582,524 B1 | 2/2017 | Murali et al. | |
| 9,703,979 B1 * | 7/2017 | Yang | ........... H04L 63/062 |

(Continued)

OTHER PUBLICATIONS

Mell et al., "Effectively and Securely Using the Cloud Computing Paradigm" dated Oct. 7, 2009, NIST, Information Technology Laboratory, Total 80 pages.

(Continued)

*Primary Examiner* — Meng Li
(74) *Attorney, Agent, or Firm* — Konrad, Raynes, Davda and Victor LLP; Janaki K. Davda (57) ABSTRACT

Provided are techniques for increasing security of objects in cloud environments by using a two-part encryption scheme. Objects to be stored in a cloud node are received. A number of keys to be used is determined. That number of keys are obtained. A sequence for the keys is obtained. The keys are concatenated using the sequence to form a concatenated key. The concatenated key is hashed to form an encryption key. Each of the objects is encrypted using the encryption key to form encrypted objects.

20 Claims, 10 Drawing Sheets

(56) References Cited

U.S. PATENT DOCUMENTS

| | | | | |
|---|---|---|---|---|
| 2008/0104403 | A1* | 5/2008 | Gueron | H04L 9/14 |
| | | | | 713/176 |
| 2011/0252242 | A1 | 10/2011 | Ureche et al. | |
| 2013/0306720 | A1* | 11/2013 | Todeschini | H04L 9/0861 |
| | | | | 235/375 |
| 2015/0006894 | A1* | 1/2015 | Bandyopadhyay | H04L 9/3236 |
| | | | | 713/171 |
| 2016/0275303 | A1* | 9/2016 | Narayanaswamy | |
| | | | | H04L 63/1458 |
| 2019/0158287 | A1* | 5/2019 | Menegusso | G06F 21/64 |

OTHER PUBLICATIONS

Mell et al., "The NIST Definition of Cloud Computing" dated Sep. 2011, Recommendations of the National Institute of Standards and Technology, Computer Security Division Information Technology Laboratory, Total 7 pages.

Gouttham "Implementation Of Simulation Of Byte Rotation Encryption Algorithm", dated 2014, International Journal of Technology Enhancements and Emerging Engineering Research, vol. 2, Issue 5, Total 4 pages.

Gupta et al., "Multiphase Encryption: A New Concept in Modern Cryptography" dated Aug. 2013, International Journal of Computer Theory and Engineering, vol. 5, No. 4, Total 3 pages.

Kumar et al., Multiple Encryption using ECC and Its Time Complexity Analysis dated Nov. 2016, International Journal of Computer Engineering in Research Trends, vol. 3, Issue 11, Total 5 pages.

Merkle et al., "On the Security of Multiple Encryption", dated Jul. 1981, vol. 24 No. 7, Technical Note Programming Techniques and Data Structures, Communications of the ACM, Total 3 pages.

Walia et al., Implementation of New Modified MD5-512 bit Algorithm for Cryptography dated Jul. 2014, International Journal of Innovative Research in Advanced Engineering (IJIRAE) ISSN: 2349-2163 , vol. 1 Issue 6, Total 11 pages.

Z. Kartit et al., "Applying Encryption Algorithm for Data Security in Cloud Storage", dated 2016, Total 14 pages.

Babitha M.P et al., "Secure Cloud Storage Using AES Encryption", dated 2016, International Conference of Automatic Control and Dynamic Optimization Techniques (ICACDOT), Total 6 pages.

* cited by examiner

| Object Identifier | Key | Sequence of Key | Timestamp |
|---|---|---|---|
| An_Object | A_Key | 2 | Timestamp x |
| Another_Object | Another_Key | 1 | Timestamp y |

FIG. 4A

| Object Group Identifier | Objects in Group | Key Sequence | Timestamp |
|---|---|---|---|
| Group_One | Objects in Group_One | Key Sequence R | Timestamp m |
| Group_Two | Objects in Group_Two | Key Sequence D | Timestamp d |

INCREASING SECURITY OF OBJECTS IN CLOUD ENVIRONMENTS BY USING A TWO-PART ENCRYPTION SCHEME

BACKGROUND

1. Field of the Invention

Embodiments of the invention relate to increasing security of objects in cloud environments by using a two-part encryption scheme.

2. Description of the Related Art

As object storage costs decrease, sending objects to a cloud node in a cloud environment for archiving purposes is becoming an option for many companies nowadays. An object may be described as a data unit that consists of a user data part and a metadata part. For example, for a photo that is stored as an object, the image itself is the user data part, while attributes associated with the object are the metadata part.

However, storing objects in the cloud node has uncovered some problems related to the nature of the object transmission and the way the object is stored in distributed locations that are not under the control of the company that generated the objects in the first place.

For example, with reference to security, in order to reduce the risks associated with object movement, a popular practice is to encrypt the objects before sending the objects over a network (e.g., over the wire) so that, in the case of a security breach at the object storage location, the objects would not be readable by someone not authorized to read the objects.

However, in conventional systems, there is a single point of failure since the objects are protected under one or more encryption keys that are, in many cases, kept in one or more key manager servers. The one or more key manager servers may be protected with a password. If someone focuses on obtaining the password of the key manager server by using social engineering or other techniques that target a human instead of a machine, then gigabytes (GB) of encrypted objects in the cloud node may be accessed, decrypted, and read. That is, with a single password, someone may be able to access the encryption keys and read the objects that are being accessed without authorization.

SUMMARY

In accordance with other embodiments, a computer program product is provided for increasing security of objects in cloud environments by using a two-part encryption scheme. The computer program product comprising a computer readable storage medium having program code embodied therewith, the program code executable by at least one processor to perform operations. Objects to be stored in a cloud node are received. A number of keys to be used is determined. That number of keys are obtained. A sequence for the keys is obtained. The keys are concatenated using the sequence to form a concatenated key. The concatenated key is hashed to form an encryption key. Each of the objects is encrypted using the encryption key to form encrypted objects.

In yet other embodiments, a computer system is provided for increasing security of objects in cloud environments by using a two-part encryption scheme. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Objects to be stored in a cloud node are received. A number of keys to be used is determined. That number of keys are obtained. A sequence for the keys is obtained. The keys are concatenated using the sequence to form a concatenated key. The concatenated key is hashed to form an encryption key. Each of the objects is encrypted using the encryption key to form encrypted objects.

In accordance with embodiments, a computer-implemented method is provided for increasing security of objects in cloud environments by using a two-part encryption scheme. The computer-implemented method comprises operations. Objects to be stored in a cloud node are received. A number of keys to be used is determined. That number of keys are obtained. A sequence for the keys is obtained. The keys are concatenated using the sequence to form a concatenated key. The concatenated key is hashed to form an encryption key. Each of the objects is encrypted using the encryption key to form encrypted objects.

Thus, embodiments advantageously provide a two-part encryption scheme that uses keys, as well as, the sequence (order) of the keys to encrypt the objects, which makes it more difficult for unauthorized access to the encrypted objects to occur. In particular, access to the encrypted objects now requires having both the keys and the sequence of the keys.

In additional embodiments, the keys are generated by a key manager server. This advantageously enables compliance of the keys with desired security rules In yet additional embodiments, the sequence is stored at a key sequence server. This advantageously separates storage of the sequence from storage of the keys, which are stored by the key manager server. This also makes it more difficult for unauthorized access to the encrypted objects to occur.

In other embodiments, the number of keys is smaller than a number of the objects. This advantageously allows for the number of keys to be smaller for efficiency of storage of the keys (e.g., there may be ten keys for one hundred objects).

In yet other embodiments, the encrypted objects from the cloud node, the keys are obtained, the sequence is obtained, the keys are concatenated using the sequence to form the concatenated key, the concatenated key is hashed to form the decryption key, and each of the encrypted objects is decrypted using the decryption key. Thus, embodiments advantageously provide a two-part decryption scheme that uses keys, as well as, the sequence (order) of the keys to decrypt the encrypted objects.

In further embodiments, a Software as a Service (SaaS) is configured to perform the operations. This advantageously allows the two-part encryption scheme to be offered as a service for increasing security of objects in cloud environments.

In yet further embodiments, the computing device, the cloud node, a key manager server, and a sequence server are part of a cloud infrastructure. This advantageously allows increasing security of objects in cloud environments by using a two-part encryption scheme in a cloud environment.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
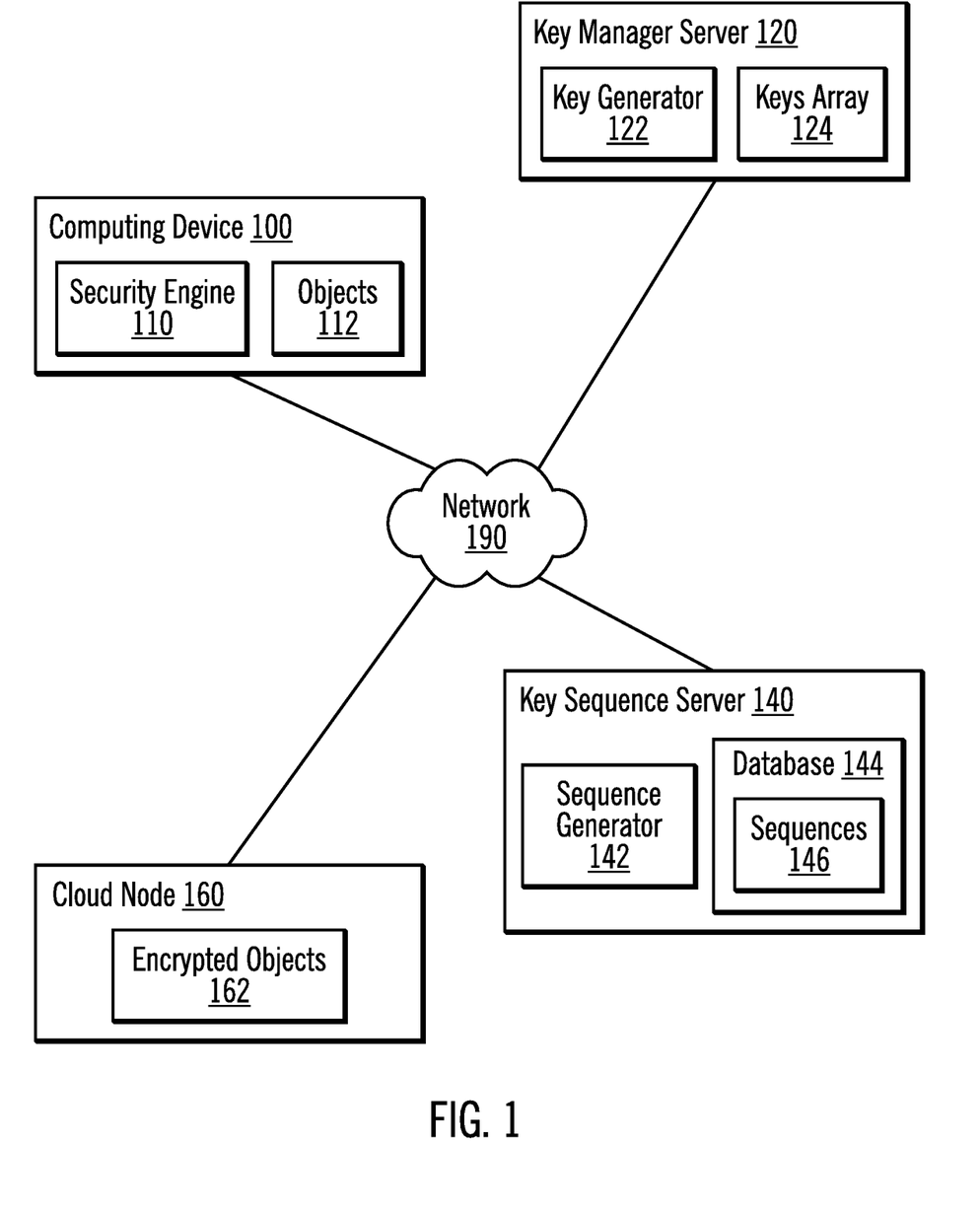
FIG. 1 illustrates, in a block diagram, a computing environment in accordance with certain embodiments.

FIG. 1 illustrates, in a block diagram, a computing environment in accordance with certain embodiments. A computing device 100, a key manager server 120, a key sequence server 140, and a cloud node 160 are coupled to each other via one or more networks 100. The computing device 100 may be any computing device that is capable of connecting to a network and that uses a protocol to send or retrieve objects. For example, the computing device 100 may be a storage controller, smart phone, tablet, server, data warehouse, tape drive, etc. Although one cloud node is illustrated for simplicity, any number of cloud nodes may be coupled to the network. 190. Having multiple cloud nodes provides distributed storage and computing capabilities.

The computing device 100 includes a security engine 110 and objects 112. An object may be described as a data unit that consists of a user data part and a metadata part. For example, for a photo that is stored as an object, the image itself is the user data part, while attributes associated with the object are the metadata part.

The key manager server 120 includes a key generator 122 and a keys array 124 (which stores keys). The key sequence server 140 includes a sequence generator 142 and a database 144 that stores sequences 146 ("key sequences"). The cloud node 160 stores encrypted objects 162.

The security engine 110 increases the level of difficulty for someone to obtain the information to gain access to the encrypted objects 162. In order to achieve this, the security engine 110 encrypts the objects 112 with different keys and in a specific sequence. With embodiments, one would need to be able to obtain two pieces of information, the keys and the sequence, to be able to read the encrypted objects 162. With embodiments, if just one piece of information (of the keys and the sequence) is obtained, the encrypted objects 162 can not be decrypted, and the encrypted objects 162 are protected.

Figure 2A:
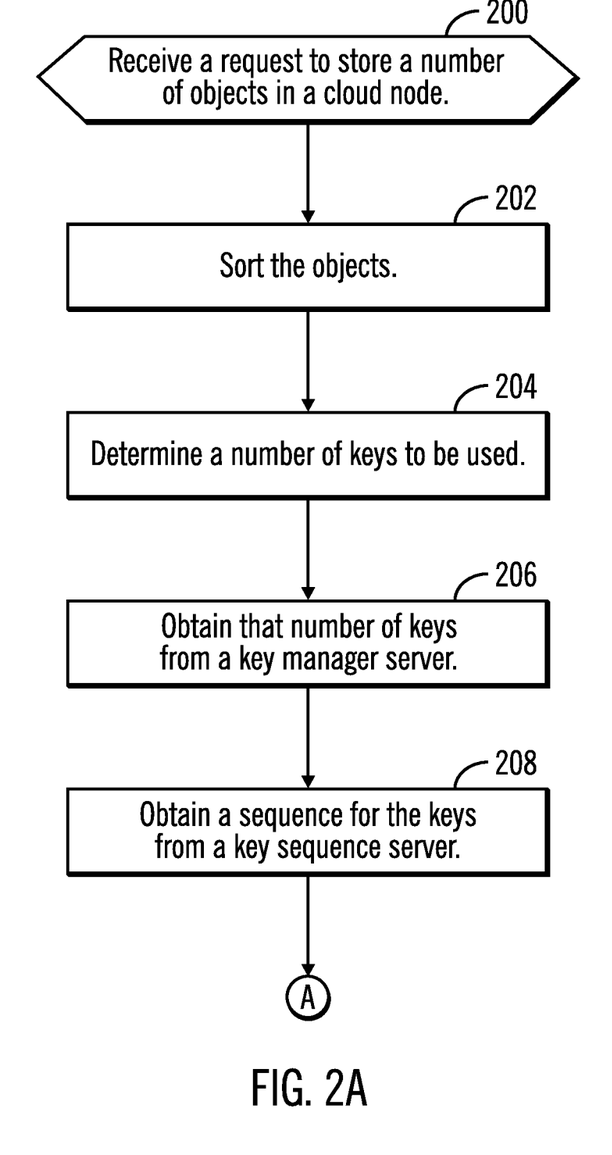
FIGS. 2A and 2B illustrate, in a flow chart, operations for encrypting and storing objects in accordance with certain embodiments.
Figure 2B:
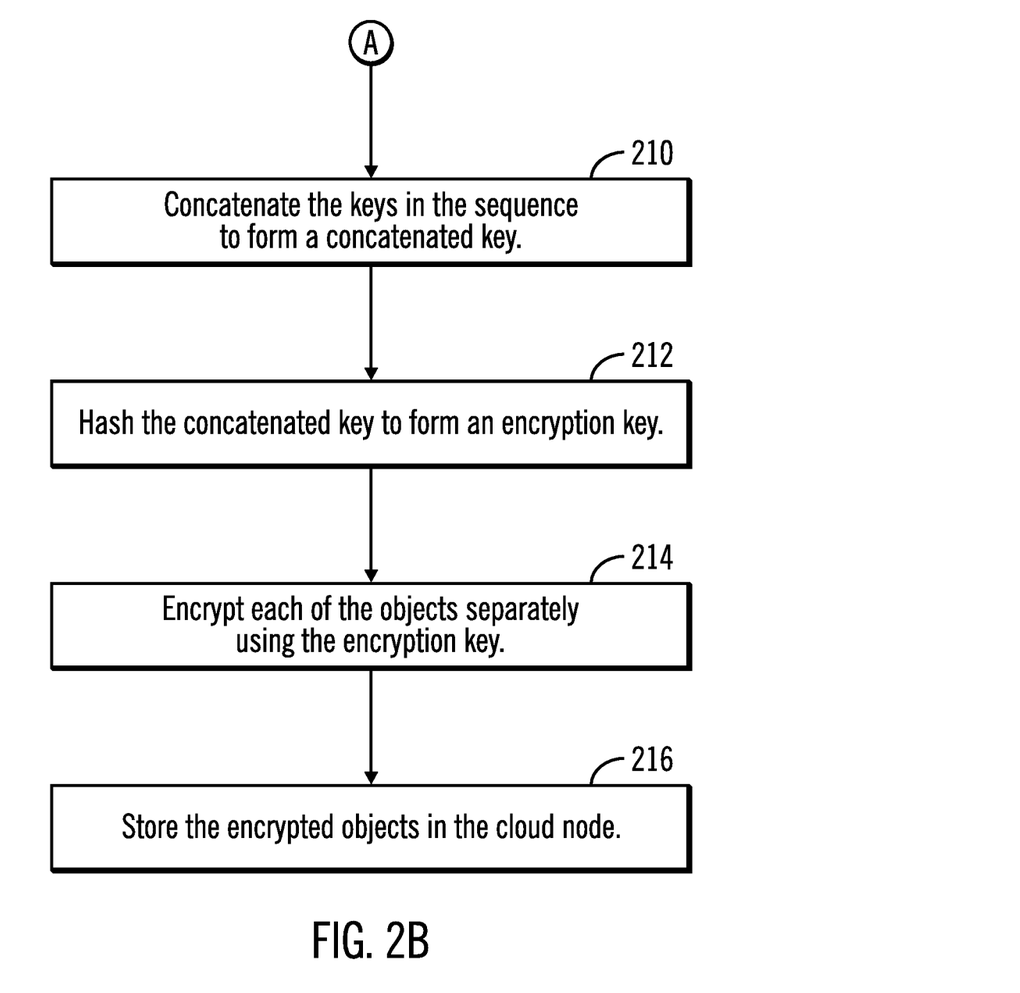

FIGS. 2A and 2B illustrate, in a flow chart, operations for encrypting and storing objects in accordance with certain embodiments. Control begins at block 200 with the security engine 110 receiving a request to store a number of objects in the cloud node 160.

In block 202, the security engine 110 sorts the objects. In certain embodiments, when a group of objects is going to be uploaded to the cloud node 160, the objects in the group are first sorted. Example sorting criteria include, for example, the size of the objects, the date and time of creation of the objects, the date and time of last access of the objects or other features associated to the objects.

In block 204, the security engine 110 determines a number of keys to be used. For example, for 100 objects, the security engine 110 may determine that ten keys are to be used to generate the encryption key. In certain embodiments, the security engine 110 may apply one or more rules to determine how many keys are to be generated. Examples of rules include: a rule that a percent of the number of objects is used to determine the number of keys (e.g., for 10%, then ten keys are generated for 100 objects), a rule that a larger number of keys be used for objects having a higher priority than other objects (to provide higher security), one or more rules generated in accordance with international security standards, etc.

In block 206, the security engine 110 obtains that number of keys from the key manager server 120. These keys may be generated by several techniques. One key generation technique is to use the key manager server 120 to generate the keys in order to make sure the keys are compliant with desired security rules. For example, for ten objects, the key sequence server 140 selects ten keys. In certain embodiments, the key sequence server 140 may applies one or more rules for selecting the keys. Examples of rules include: a rule that the keys be randomly selected, a rule that the keys are to be different keys, a rule that the keys are ones that have not been used within a period of time (e.g., within the last month), etc. Embodiments allow adding new rules to the key sequence server 140 to help generate the keys.

In block 208, the security engine 110 obtains a sequence (order) for the keys from the key sequence server 140. For example, for ten random keys, the key sequence server 140 provides an order for those ten keys. In certain embodiments, the key sequence server 140 may apply one or more rules for determining the order of the keys. Examples of rules include: a rule that the order be randomly selected, a rule that the order has not been used within a period of time (e.g., within the last month), a rule that the order is the reverse order of the objects (e.g., the key for object 1 is in the tenth position in the order, while the key for object 10 is in the first position in the order), etc. Embodiments allow adding new rules to the key sequence server 140 to help generate different sequences of keys that are difficult to guess. From block 208 (FIG. 2A), processing continues to block 210 (FIG. 2B).

In block 210, the security engine 110 concatenates the keys in the sequence to form a concatenated key. In block 212, the security engine 110 hashes the concatenated key to form an encryption key.

In block 214, the security engine 110 encrypts each of the objects separately using the encryption key. Thus, each of the objects is encrypted with the same encryption key. For example, for 100 objects and encryption key Encrypt Key, each of the 100 objects is encrypted with Encrypt Key.

In block 216, the security engine 110 stores the encrypted objects in the cloud node 160. In certain embodiments, the security engine 110 sends the encrypted objects with a command to the cloud node 160, and the cloud node 160 stores the encrypted objects. In certain embodiments, the cloud node 160 determines the storage media for storing the objects. For example, the cloud node 160 may store the objects initially on disk and may automatically move the objects from disk to tape after a period of time. That is, the cloud node 160 manages the storage infrastructure, for example, to optimize costs.

Figure 3:
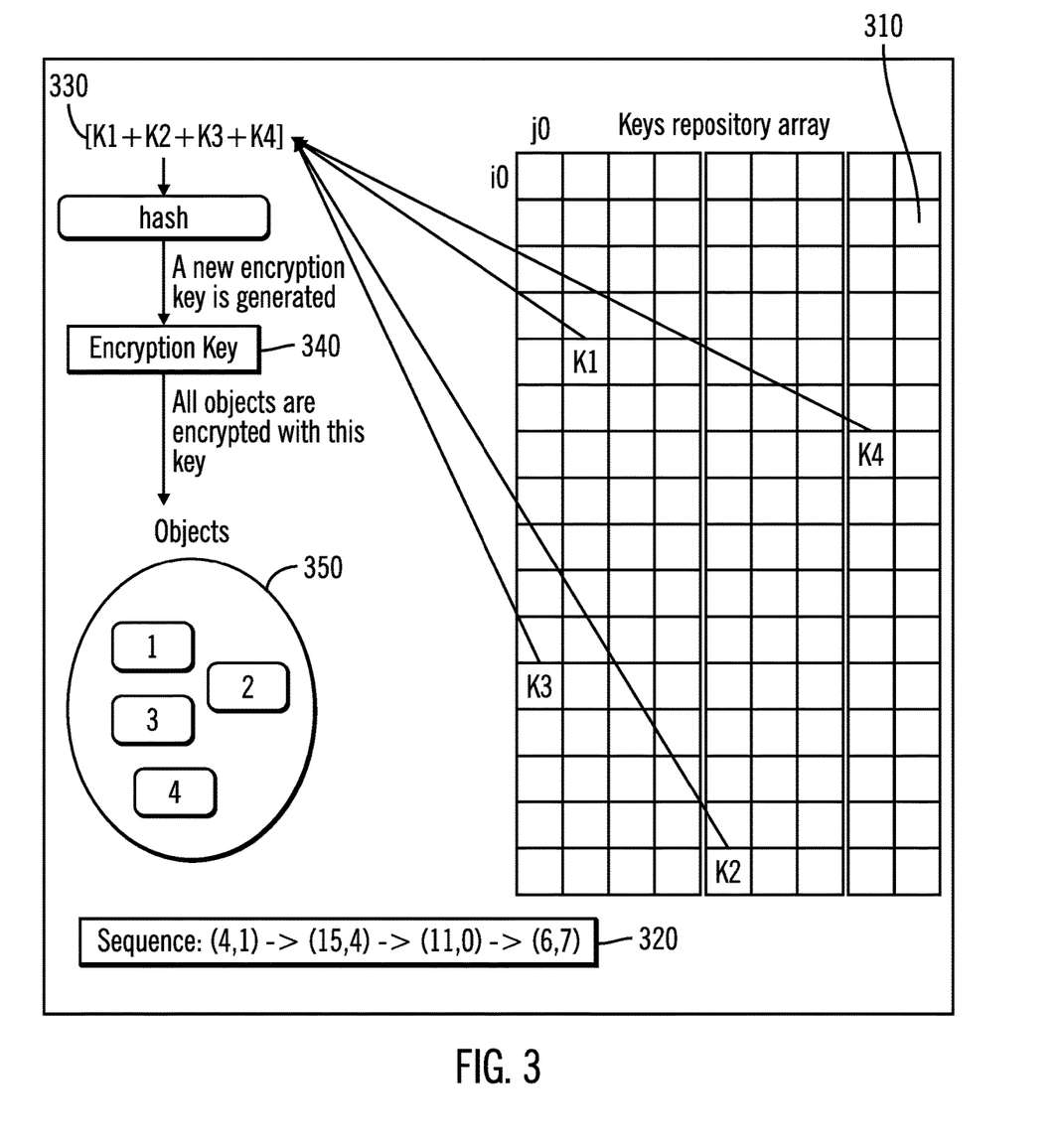
FIG. 3 illustrates an example of generation of an encryption key in accordance with certain embodiments.

FIG. 3 illustrates an example of generation of an encryption key in accordance with certain embodiments. In certain embodiments, keys are stored in a keys repository array 310 at the key manager server 120. The keys are concatenated to form a concatenated key 330. The concatenated key 330 is hashed to form an encryption key 340. The encryption key 340 is used to encrypt each of the objects 350. Similarly, a decryption key may be generated to decrypt each of the objects 350. That is, the encryption key and the decryption key are the same, and both need the keys and the sequence of the keys to generate the same hash.

In certain embodiments, once the keys are obtained, the sequence is identified based on the position of a key in the keys repository array 310 (e.g., by array row, array column). For example, for key 1, the array row is 4, and the array column is 1, which is (4,1). The sequence is saved at the key sequence server 140. The sequence is kept in order to be able to generate the same hash again to decrypt the objects. The complexity of the function is non-linear with the number of operations to guess the correct sequence growing exponentially with each new key added to the concatenation. The sequence of the keys is enforced so that there are two pieces of information needed to decrypt and read the objects.

Figure 4A:
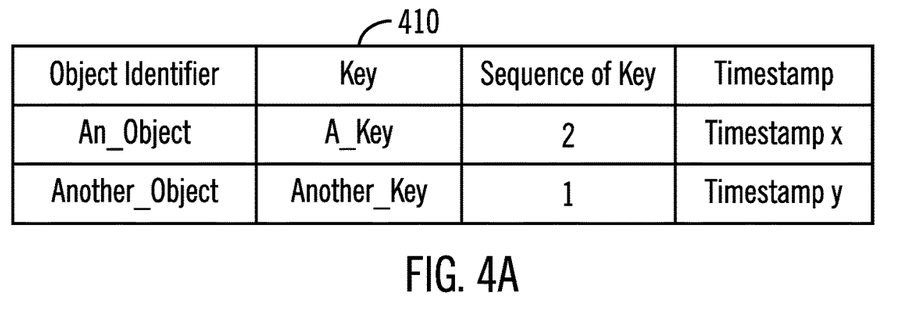
FIGS. 4A and 4B illustrate example tables for storing a sequence for a group of objects in accordance with certain embodiments.
Figure 4B:
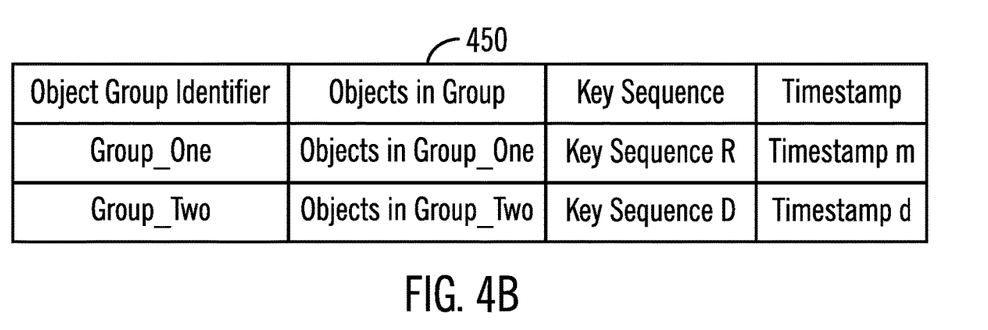

FIGS. 4A and 4B illustrate example tables for storing a sequence for a group of objects in accordance with certain embodiments. With the example of FIG. 4A, there is a key generated for each object (i.e., the number of keys equals the number of objects). Table 400 includes a column for an object identifier, a column for a key, a column for a sequence of that key (e.g., is that key in the first position, second position, etc. for concatenation), and a column for a timestamp. In certain embodiments, there may be additional columns. In certain embodiments, table 400 is stored at the computing device 100. In certain embodiments, table 400 is stored in the database 144 at the key sequence server 140.

With the example of FIG. 4B, there are fewer keys generated than the number of objects. Table 450 includes a column for an object group identifier, a column for the objects in that object group, a column for the sequence for that object group, and a column for a timestamp. The sequence provides the order of the keys for the group. In certain embodiments, there may be additional columns. With these embodiments, the security engine 110 receives a group of objects with an object group identifier. Once the encryption key is generated, the security engine 110 stores the sequence of the keys for that object group identifier. Then, a user may decrypt the objects by using the object group identifier to obtain both the list of objects in that group and the sequence. In certain embodiments, table 450 is stored at the computing device 100. In certain embodiments, table 400 is stored in the database 144 at the key sequence server 140.

Figure 5A:
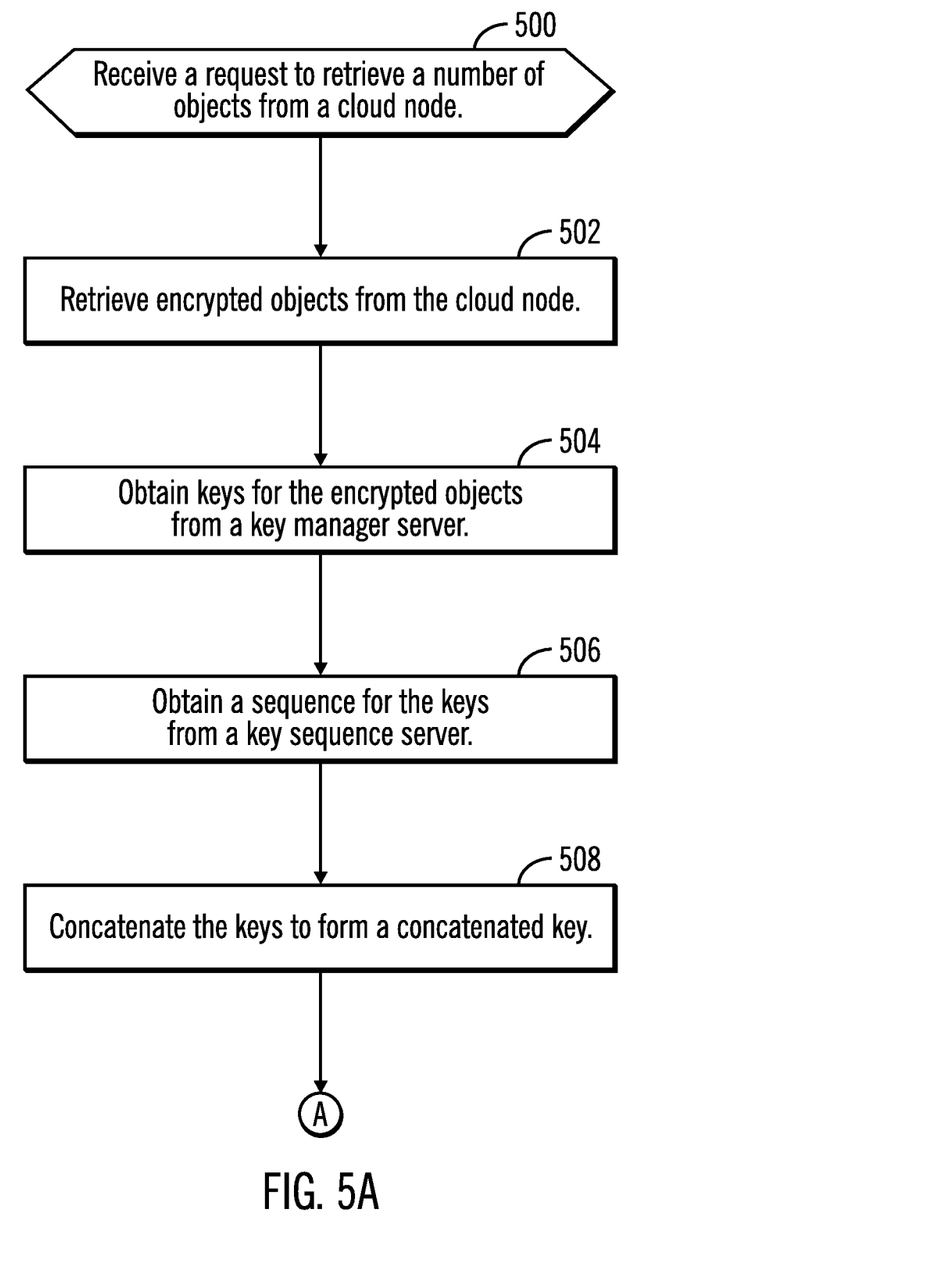
FIGS. 5A and 5B illustrate, in a flow chart, operations for restoring encrypted objects in accordance with certain embodiments.
Figure 5B:
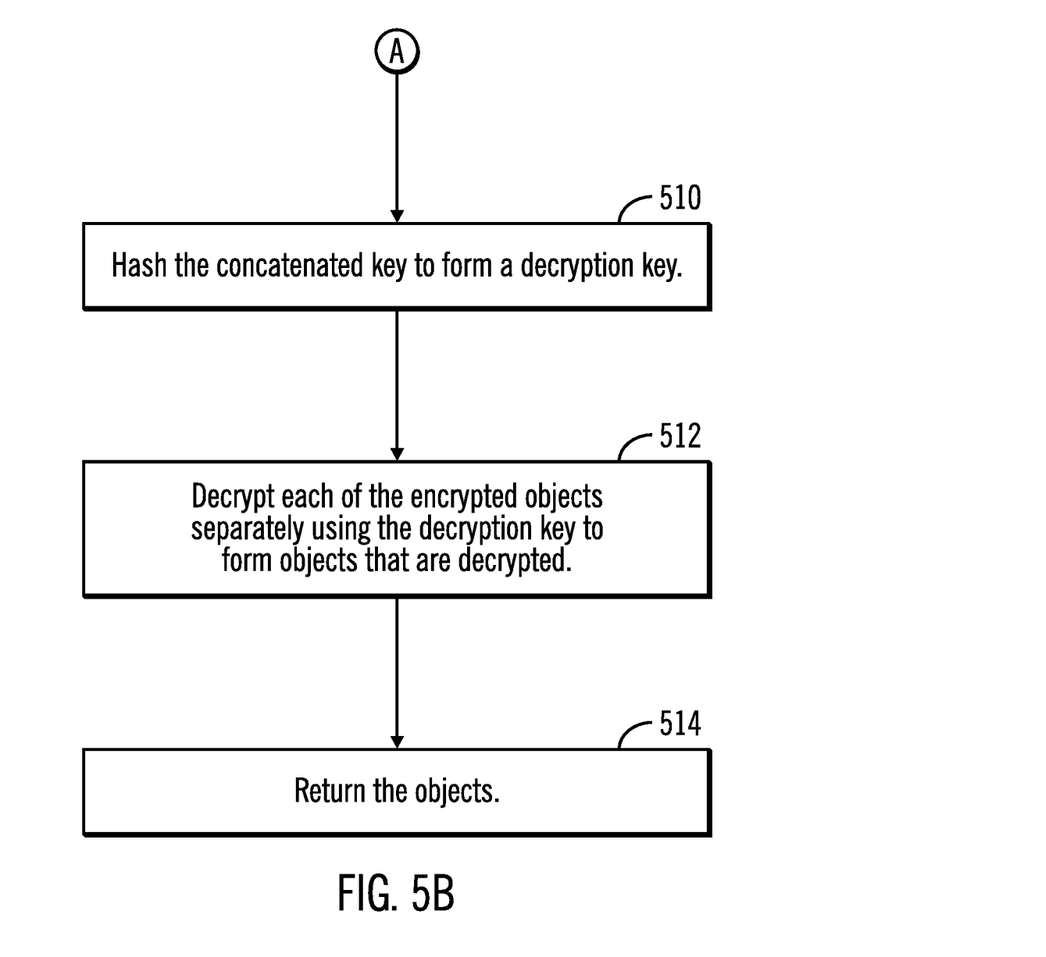

FIGS. 5A and 5B illustrate, in a flow chart, operations for restoring encrypted objects in accordance with certain embodiments. Control begins at block 500 with the security engine 110 receiving a request to retrieve a number of objects from the cloud node 160. In block 502, the security engine 110 retrieves encrypted objects from the cloud node.

In block 504, the security engine 110 obtain keys for the encrypted objects from the key manager server 120. In block 506, the security engine 110 obtains a sequence for the keys from the key sequence server 140.

In block 508, the security engine 110 concatenates the keys to form a concatenated key. From block 508 (FIG. 5A), processing continues to block 510 (FIG. 5B).

In block 510, the security engine 110 hashes the concatenated key to form a decryption key. In block 512, the security engine 110 decrypts each of the encrypted objects separately using the decryption key to form objects that are decrypted. In block 514, the security engine 110 performs additional processing, such as storing the objects at the computing device 100, forwarding the objects to another computing device (e.g., a storage controller may return the objects to a host), etc.

A re-keying process may download encrypted objects, decrypt the encrypted objects with the appropriate keys and a first sequence of the keys, generate second (different) sequence of the keys, encrypt the objects using the appropriate keys and the second sequence of the keys, and upload the encrypted objects again. A table in a database is updated to reflect the new sequence and new keys used to encrypt the set of objects.

Embodiments increase the security of an encryption mechanism by enforcing the use of different keys in a very particular sequence to encrypt multiple objects. These objects may be volumes in a disk system, tapes or other storage units in different environments.

Embodiments obtain a different encryption key for each object that is being encrypted, then concatenates the keys by keeping the sequence in which the objects are encrypted, then the concatenation is hashed, and this hash is used to encrypt each of the objects.

Certain embodiments use the devices being encrypted as their own personal encryption keys. That is, some devices, such as tape drives, have unique serial numbers or unique identifiers that may also be used as keys. Embodiments concatenate the serial numbers of the tape drives that are uploading objects using a specific sequence and then hash them to generate an encryption key based on keys that were not obtained from the key manager server 120.

With embodiments, the sequence of the keys for the encryption key provides additional security. A group of objects are encrypted with the same encryption key and may be encrypted in parallel.

Within a data storage system, embodiments encrypt data in a two-part process, one having a non-linear algorithm. Embodiments generate a new key for each object from a group of objects (e.g., selected from a table) in a particular sequence. An encryption key is generated by concatenating the key for each object to form a concatenated key and hashing (non-linear) the concatenated key.

In certain alternative embodiments, once there is a list of objects, the upload process starts. For each object that is going to be uploaded, a key is generated. This key may be generated by several techniques. One key generation technique is to use the key manager server 120 in order to make sure the key is compliant with desired security rules.

Once the key is generated, the object is encrypted using that key, and then the object is uploaded to the cloud node 160. The same process repeats for each object, which means that if there are N objects being uploaded, then there will be N keys generated such that for each object $O_i$ there will be a key $K_i$.

The keys may be managed by the key management server 120 and the exact sequence used to upload the objects and the corresponding keys may be stored in a database table in the key sequence server 140, separate from the key management server 120 (e.g., in a location different than the location of the key management server 120). In certain embodiments, when the objects are going to be restored from the cloud node 160 to the computing device 100, the database table is sorted by sequence, and, for each row, the current object is first downloaded and decrypted using the key obtained from the key management server 120.

Figure 6:
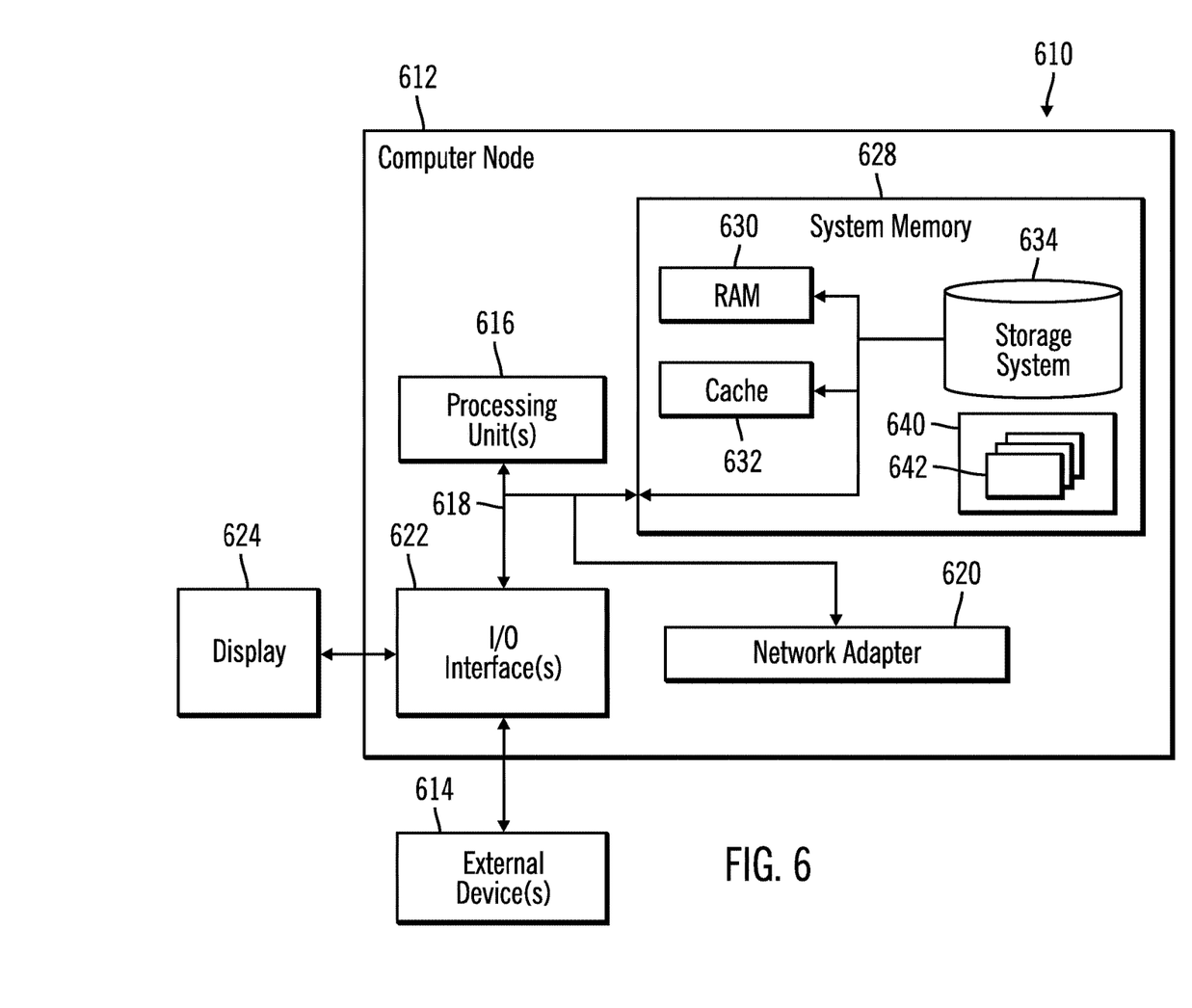
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the computing device 100, the key manager server 120, the key sequence server 140, and the cloud node 160 may each have the architecture of computer node 612.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
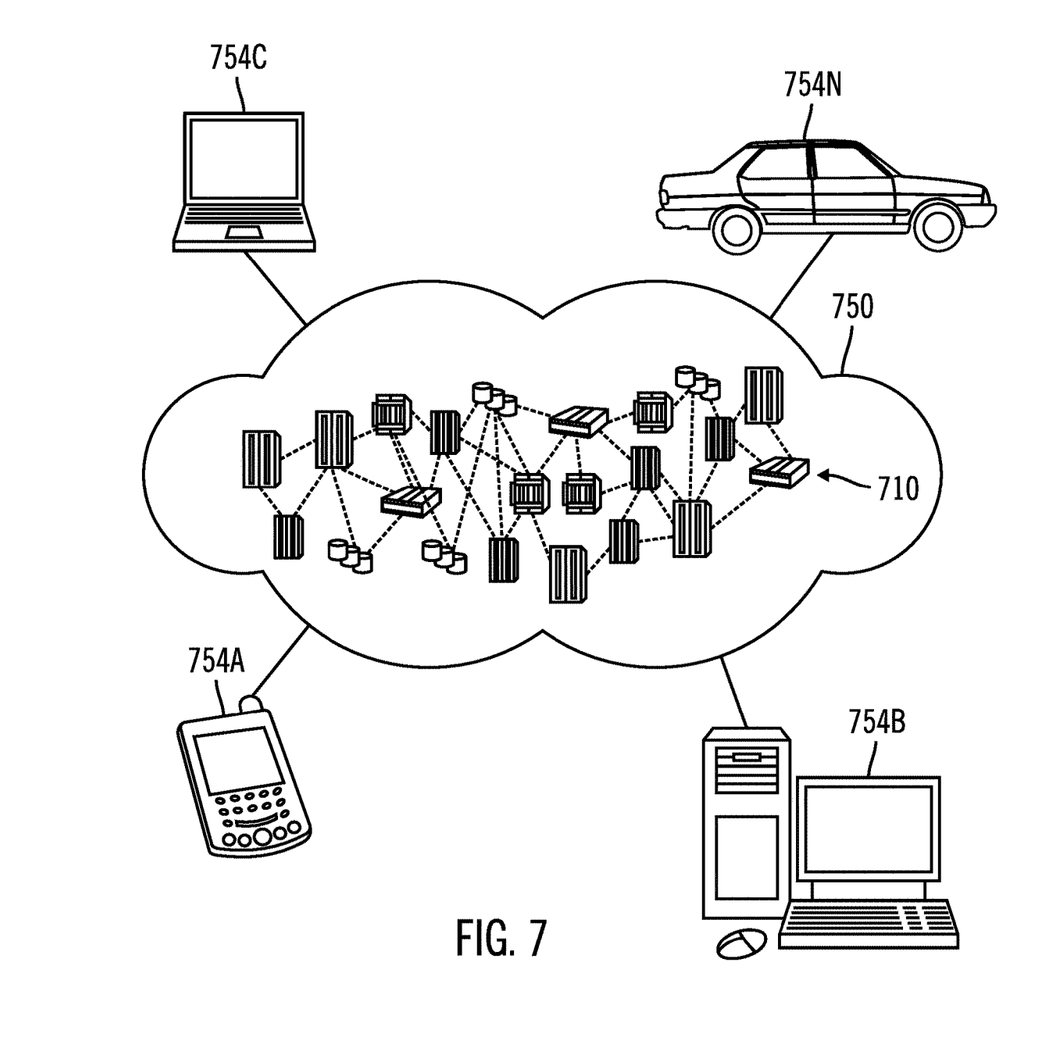
FIG. 7 illustrates a cloud computing environment in accordance with certain embodiments.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
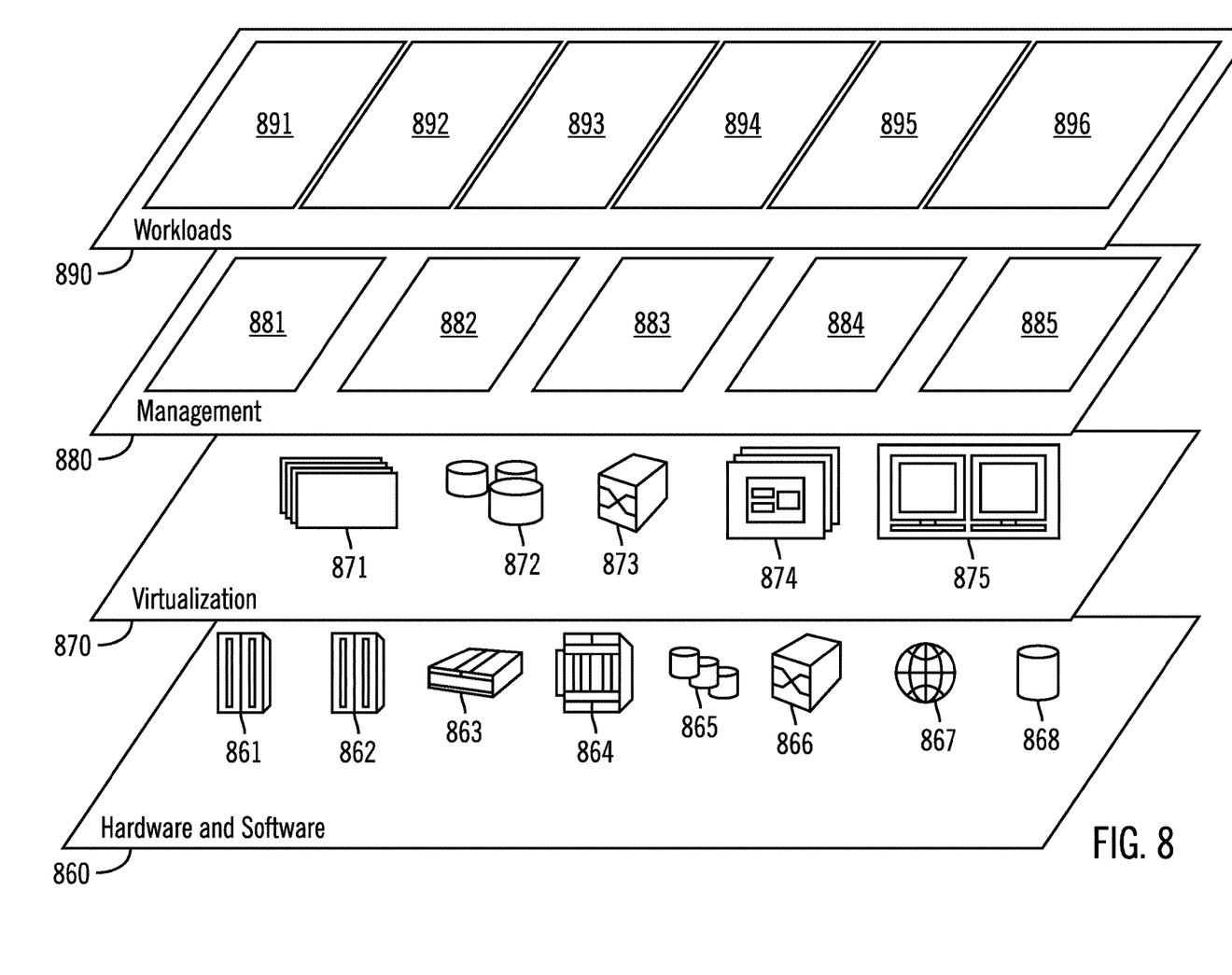
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and increasing security of objects in cloud environments by using a two-part encryption scheme 896

Thus, in certain embodiments, software or a program, implementing increase of security of objects in cloud environments by using a two-part encryption scheme in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer program product, the computer program product comprising a computer readable storage medium having program code embodied therewith, the program code executable by at least one processor of a computing device to perform operations comprising:
   receiving objects to be stored in a cloud node;
   determining a number of keys to be used for the objects, wherein the number of keys is equal to or less than a number of the objects;
   obtaining that number of keys;
   obtaining a sequence for the keys, wherein the sequence comprises an order based on at least one rule, wherein the at least one rule is selected from a group consisting of: a rule that the order be random, a rule that the order has not been used within a period of time, and a rule that the order is a reverse order of the objects;
   concatenating the keys using the sequence to form a concatenated key;
   hashing the concatenated key to form an encryption key;
   encrypting each of the objects using the encryption key to form encrypted objects; and
   storing the encrypted objects in the cloud node.

2. The computer program product of claim 1, wherein the keys are generated by a key manager server.

3. The computer program product of claim 1, wherein the sequence is stored at a key sequence server.

4. The computer program product of claim 1, wherein the program code is executable by the at least one processor of the computing device to perform further operations comprising:
   retrieving the encrypted objects from the cloud node;
   obtaining the keys;
   obtaining the sequence;
   concatenating the keys using the sequence to form the concatenated key;
   hashing the concatenated key to form a decryption key; and
   decrypting each of the encrypted objects using the decryption key.

5. The computer program product of claim 1, wherein a Software as a Service (SaaS) is configured to perform the operations of the computer program product.

6. The computer program product of claim 1, wherein the computing device, the cloud node, a key manager server, and a key sequence server are part of a cloud infrastructure.

7. The computer program product of claim 1, wherein the number of keys to be used is determined based on at least one rule, wherein the at least one rule is selected from a group consisting of: a rule that a percent of the number of the objects is used to determine the number of, a rule that a larger number of keys be used for objects having a higher priority, and a rule in accordance with international security standards.

8. A computing device, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   receiving objects to be stored in a cloud node;
   determining a number of keys to be used for the objects, wherein the number of keys is equal to or less than a number of the objects;
   obtaining that number of keys;
   obtaining a sequence for the keys, wherein the sequence comprises an order based on at least one rule, wherein the at least one rule is selected from a group consisting of: a rule that the order be random, a rule that the order has not been used within a period of time, and a rule that the order is a reverse order of the objects;
   concatenating the keys using the sequence to form a concatenated key;
   hashing the concatenated key to form an encryption key;
   encrypting each of the objects using the encryption key to form encrypted objects; and
   storing the encrypted objects in the cloud node.

9. The computing device of claim 8, wherein the keys are generated by a key manager server.

10. The computing device of claim 8, wherein the sequence is stored at a key sequence server.

11. The computing device of claim 8, wherein the operations further comprise:
   retrieving the encrypted objects from the cloud node;
   obtaining the keys;
   obtaining the sequence;
   concatenating the keys using the sequence to form the concatenated key;
   hashing the concatenated key to form a decryption key; and
   decrypting each of the encrypted objects using the decryption key.

12. The computing device of claim 8, wherein a Software as a Service (SaaS) is configured to perform the operations of the computing device.

13. The computing device of claim 8, wherein the computing device, the cloud node, a key manager server, and a key sequence server are part of a cloud infrastructure.

14. The computing device of claim 8, wherein the number of keys to be used is determined based on at least one rule, wherein the at least one rule is selected from a group consisting of: a rule that a percent of the number of the objects is used to determine the number of, a rule that a larger number of keys be used for objects having a higher priority, and a rule in accordance with international security standards.

15. A method implemented in a computing device, comprising operations for:
   receiving objects to be stored in a cloud node;
   determining a number of keys to be used for the objects, wherein the number of keys is equal to or less than a number of the objects;
   obtaining that number of keys;
   obtaining a sequence for the keys, wherein the sequence comprises an order based on at least one rule, wherein the at least one rule is selected from a group consisting of: a rule that the order be random, a rule that the order has not been used within a period of time, and a rule that the order is a reverse order of the objects;
   concatenating the keys using the sequence to form a concatenated key;
   hashing the concatenated key to form an encryption key;
   encrypting each of the objects using the encryption key to form encrypted objects; and
   storing the encrypted objects in the cloud node.

16. The method of claim 15, wherein the keys are generated by a key manager server.

17. The method of claim 15, wherein the sequence is stored at a key sequence server.

18. The method of claim 15, wherein the operations further comprise:
   retrieving the encrypted objects from the cloud node;
   obtaining the keys;
   obtaining the sequence;
   concatenating the keys using the sequence to form the concatenated key;
   hashing the concatenated key to form a decryption key; and
   decrypting each of the encrypted objects using the decryption key.

19. The method of claim 15, wherein a Software as a Service (SaaS) is configured to perform the operations of the method.

20. The method of claim 15, wherein the number of keys to be used is determined based on at least one rule, wherein the at least one rule is selected from a group consisting of: a rule that a percent of the number of the objects is used to determine the number of, a rule that a larger number of keys be used for objects having a higher priority, and a rule in accordance with international security standards.

* * * * *